United States Patent [19]

Claussen

[11] 4,426,312
[45] Jan. 17, 1984

[54] LIQUID CRYSTAL MATERIAL CONTAINING DISAZO DYESTUFFS

[75] Inventor: Uwe Claussen, Leverkusen, Fed. Rep. of Germany

[73] Assignee: Bayer Aktiengesellschaft, Leverkusen, Fed. Rep. of Germany

[21] Appl. No.: 330,631

[22] Filed: Dec. 14, 1981

[30] Foreign Application Priority Data

Dec. 30, 1980 [DE] Fed. Rep. of Germany ...... 3049454

[51] Int. Cl.³ .......................... C09K 3/34; G02F 1/13
[52] U.S. Cl. ................................ 252/299.1; 350/349
[58] Field of Search ...................... 252/299.1; 350/349

[56] References Cited

U.S. PATENT DOCUMENTS

| | | | |
|---|---|---|---|
| 4,128,497 | 12/1978 | Cole, Jr. et al. | 252/299.1 |
| 4,137,193 | 1/1979 | Osman et al. | 252/299.1 |
| 4,145,114 | 3/1979 | Coates et al. | 252/299.1 |
| 4,308,161 | 12/1981 | Aftergut et al. | 252/299.1 |
| 4,308,162 | 12/1981 | Cole, Jr. et al. | 252/299.1 |
| 4,308,163 | 12/1981 | Aftergut et al. | 252/299.1 |
| 4,308,164 | 12/1981 | Aftergut et al. | 252/299.1 |
| 4,350,603 | 9/1982 | Aftergut et al. | 252/299.1 |
| 4,359,398 | 11/1982 | Cole, Jr. et al. | 252/299.1 |
| 4,394,070 | 7/1983 | Brown et al. | 252/299.1 |
| 4,395,350 | 7/1983 | Boller et al. | 252/299.1 |

FOREIGN PATENT DOCUMENTS

| | | | |
|---|---|---|---|
| 56-57850 | 5/1981 | Japan | 252/299.1 |
| 1555954 | 11/1979 | United Kingdom . | |
| 1555955 | 11/1979 | United Kingdom . | |
| 2079304 | 1/1982 | United Kingdom | 252/299.1 |

OTHER PUBLICATIONS

Seki, H., et al., Abstracts of the 8th Int. Liq. Cryst. Conf., Kyoto, Japan, L-1P (Jul. 1980).
Bloom, A., et al., Mol. Cryst. Liq. Cryst., vol. 41 (left)., pp. 1-4 (1977).
Bloom, A., et al., Mol. Cryst. Liq. Cryst., vol. 40, pp. 213-221 (1977).
Jones, et al., Mol. Cryst. Liq. Cryst., vol. 60, pp. 99-110 (1980).
Gognard, J., et al., Mol Cryst. Liq. Cryst., vol. 68, pp. 207-229 (1981).
Cox, R. J., Mol. Cryst. Liq. Cryst. vol. 55, pp. 1-32 (1979).
Seki, H., et al., JPN. J. Appl. Phys., vol. 21, No. 1, pp. 191-192 (1982).

*Primary Examiner*—Teddy S. Gron
*Attorney, Agent, or Firm*—Sprung, Horn, Kramer & Woods

[57] ABSTRACT

Liquid crystal material containing a disazo dyestuff of formula $$R_2-(Y)_n-\underset{R_3}{\underset{|}{\bigcirc}}-N=N-\underset{R_5}{\underset{|}{\overset{R_4}{\bigcirc}}}-N=N-\underset{}{\overset{R_6}{\bigcirc}}-O-R_1$$

in which
$R_1$ designates alkyl, aralkyl, cycloalkyl, aryl, alkylsulphonyl, aralkylsulphonyl, cycloalkylsulphonyl, arylsulphonyl, acyl or a R—NH—CO— or R—O—CO— group, in which
R represents alkyl, aralkyl, cycloalkyl or aryl, it being possible for the radicals mentioned for $R_1$ to be substituted, and n is 0 or 1,
Y designates —O—,
$R_2$ has one of the meanings given above for $R_1$, if n=1, or is hydrogen, if n=0, and
$R_3$, $R_4$, $R_5$ and $R_6$ designate hydrogen, optionally substituted alkyl, alkoxy, halogen or cyano.

10 Claims, No Drawings

LIQUID CRYSTAL MATERIAL CONTAINING DISAZO DYESTUFFS

The invention relates to a liquid crystal material containing disazo dyestuffs. The liquid crystal materials are used in displays.

In this context, displays are understood as optoelectronic display elements, which as a rule consist of 2 parallel plates arranged at a distance of 5–50μ, at least one plate being made of a material which transmits light. Electrodes are attached on the insides of the plates, and the space between these are filled with the liquid crystal material containing a dyestuff. The optoelectronic display is built up and produced in a known manner (Kelker, Hatz, Handbook of Liquid Crystals page 611 et seq.; 1980).

It is also known that selected dyestuffs, which follow the changes in direction and order of the liquid crystal material effected by an externally applied field (so-called guest-host interaction), can be embedded in the liquid crystal material. Suitable dyestuffs with this particular property are rare if, besides the diochroic properties mentioned, properties which permit industrial utilisation of the effect are additionally required. Important prerequisites for such utilisation are fastness to light, a sufficient solubility, and compatibility with other dyestuffs.

Numerous suitable individual dyestuffs are described in the literature; thus, azo dyestuffs have also frequentlty been mentioned (R. J. Cox: Mol. Crystals & Liquid Crystals, 1979, pages 1–32).

The use of azo compounds in liquid crystals materials is based on the consideration that the degree of order of the molecule increases as the length of the molecule increases or as the intramolecular charge transfer increases (F. Jones and R. Reeve: J. Soc. Dyers Col. 1979, pages 352–357). Consequently, the aim has been to prepare either compounds which are as elongated as possible, such as, for example, those in the form of trisazo dyestuffs which have been disclosed in German Offenlegungsschrift No. 2,627,215, or "short" monoazo dyestuffs, the charge transfer of which was maximised by polar terminal substitution, for example 4-nitro-4'-aminoazobenzene.

Surprisingly, it has now been found that disazo dyestuffs in which the terminal substituents differ little in polarity, of the formula I

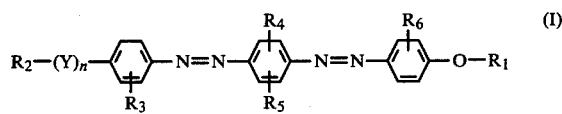

in which
R$_1$ designates alkyl, aralkyl, cycloalkyl, aryl, alkylsulphonyl, aralkylsulphonyl, cycloalkylsulphonyl, arylsulphonyl, acyl or a R—NH—CO— or R—O—CO— group,
in which
R represents alkyl, aralkyl, cycloalkyl or aryl, it being possible for the radicals mentioned for R$_1$ to be substituted, and
n is 0 or 1,
Y designates —O—,
R$_2$ has one of the meanings given above for R$_1$, if n=1, or is hydrogen, if n=0, and
R$_3$, R$_4$, R$_5$ and R$_6$ designate hydrogen, optitonally substituted alkyl, alkoxy, halogen or cyano.

The dyestuffs give yellow to reddish-tinged yellow colour shades. They display a degree of order which is better than or comparable to that of the optimised azo dyestuff types of the state of the art and addititionally provide considerable technological advantages.

Compounds of the formula (I) which are preferably used in liquid crystal materials are those
in which
R$_1$ and R$_2$ are different and (for n=1) preferably designate C$_1$–C$_8$-alkyl, benzyl, phenethyl, C$_3$–C$_7$-cycloalkyl, phenyl, naphthyl, C$_1$–C$_8$-alkylsulphonyl, benzylsulphonyl, phenethylsulphonyl, C$_3$–C$_7$-cycloalkylsulphonyl, phenylsulphonyl, naphthylsulphonyl, (C$_1$–C$_8$-alkyl)-carbonyl, benzylcarbonyl, phenethylcarbonyl, (C$_3$–C$_7$-cycloalkyl)-carbonyl, benzoyl, naphthoyl or a R'—NH—CO— or R'—O—CO— group,
in which
R' represents C$_1$–C$_8$-alkyl, benzyl, phenethyl, C$_3$–C$_7$-cycloalkyl, phenyl or naphthyl, it being possible for the radicals mentioned for R$_1$ and R$_2$ to be substituted, and
R$_3$, R$_4$, R$_5$ and R$_6$ preferably designate hydrogen, optionally substituted C$_1$–C$_6$-alkyl or C$_1$–C$_6$-alkoxy, fluorine, chlorine, bromine or cyano.

Dyestuffs of the formula (I) which are preferably used are also those
in which
R$_1$ and R$_2$ (for n=1) represent C$_1$–C$_8$-alkyl, benzyl, which can be substituted by fluorine, chlorine, bromine, C$_1$–C$_8$-alkyl, trifluoromethyl, C$_1$–C$_8$-alkoxy, nitro, cyano, amino or amino which is optionally monosubstituted or disubstituted by C$_1$–C$_8$-alkyl or phenyl, or phenyl, which can be substituted by fluorine, chlorine, bromine, C$_1$–C$_8$-alkyl, trifluoromethyl, C$_1$–C$_8$-alkoxy, nitro, cyano, amino or amino which is optionally monosubstituted or disubstituted by C$_1$–C$_8$-alkyl or phenyl, or C$_1$–C$_8$-alkylsulphonyl or a R—NH—CO— or R—O—CO— group,
in which
R designates C$_1$–C$_8$-alkyl, cyclohexyl or phenyl, or R$_2$ (for n=0) represents hydrogen.

Further preferred dyestuffs of the formula I are those in which
R$_3$, R$_4$ and R$_5$ represent hydrogen, C$_1$–C$_4$-alkyl or C$_1$–C$_4$-alkoxy.

Particularly preferred compounds of the formula I are those
in which
R$_1$ and R$_2$ are different, and one of these radicals represents benzyl, which can be substituted by fluorine, chlorine, bromine, C$_1$–C$_8$-alkyl, trifluoromethyl, C$_1$–C$_8$-alkoxy, nitro, cyano, amino or amino which is optionally monosubstituted or disubstituted by C$_1$–C$_8$-alkyl or phenyl.

The dyestuffs according to the invention are known, or they can be prepared by known processes. To synthesise an unsymmetrically substituted disazo dyestuff, a phenol ether-amine is diazotised and the diazotisation product is coupled to a middle component with a protected amino group, for example anilinemethanesulphonic acid, in an acid or alkaline medium. The protective group is removed by alkaline or acid saponification and the amino group liberated is diazotised. The diazotisation product is coupled to a phenol in an alkaline medium, to give a product which can be reacted with alkylating agents, such as benzyl halides, activated esters, alkyl halides or diazomethane, with acylating agents, such as acyl anhydrides, acyl halides, phosgene or isocyanates, or with carbonic acid esters or aryl- or alkyl-sulphonic acid halides, to give the end products.

Symmetric compounds are more readily accessible via a tetrazotised diamine and 2-fold coupling to a phenol. The terminal hydroxyl groups are blocked with alkylating or acylating compounds in a subsequent step.

As a rule, the compounds thus prepared are not sufficiently pure for use in displays. Rather, it has proved advantageous to purify them by chromatographic processes, preferably by column chromatography or partition chromatography.

The dyestuffs according to the invention can be used dissolved in liquid crystal materials. They are preferably used in mixtures of dyestuffs. Possible liquid crystal materials are those with positive dielectric anisotropy. Examples which may be mentioned are mixtures of 4-(4-cyanophenyl)-alkylcyclohexanes, in which alkyl denotes propyl (25%), n-pentyl (37%) and n-heptyl (25%) and 12% of 4-(4'-cyanobiphenyl)-n-pentylcyclohexane is used as an additional component, or mixtures of 4-(4'-cycanobiphenyl)-alkyl and -alkoxy compounds, for example those in which alkyl denotes n-pentyl (53%) and n-heptyl (25%) and alkoxy denotes octyloxy (14%), and 4-(4'-cyanoterphenyl)-alkyl compounds, for example those in which alkyl is n-pentyl (8%). Mixtures which contain 4-cyanophenyl-pyrimidines are also suitable. The liquid crystal material preferably contains about 0.01 to about 30% by weight, particularly preferably about 0.5 to about 5% by weight, of the dyestuffs of the formula I.

The dyestuffs dissolved in the liquid crystal materials, and their mixtures, especially with anthraquinone dyestuffs, can be used in opto-electronic displays.

EXAMPLE 1

12.3 g of anisidine are diazotised with 7 g of sodium nitrite and the diazotisation product is coupled to 19 g of anilinemethanesulphonic acid at 5° and at pH 4.5. After 4 hours, the dyestuff which has precipitated is filtered off with suction. The moist product is warmed to 60°–80° in 100 ml of half-concentrated hydrochloric acid for 40 minutes. The mixture is poured onto 200 g of ice and diazotisation is carried out with 6.5 g of sodium nitrite, the solution is carefully neutralised and coupling is carried out with 10 g of phenol at pH 7.5–8.5. After 3 hours, the dyestuff is filtered off with suction, washed with water and then with a little methanol and dried. 28 g of disazo dyestuff are obtained as a red powder. 7 g of the resulting product are dissolved in 40 ml of methyl ethyl ketone, and 2 g of potassium carbonate and 5 g of benzoyl chloride are added. The mixture is heated at the boiling point until samples taken no longer change colour when acidified. When the reaction has ended, the product is filtered off with suction, washed with water and dried. For purification, the dyestuff is chromatographed 1:100 on silica gel and eluted with chloroform.

EXAMPLES 2–12

The compounds which follow are obtained by a process completely analogous to that described in Example 1:

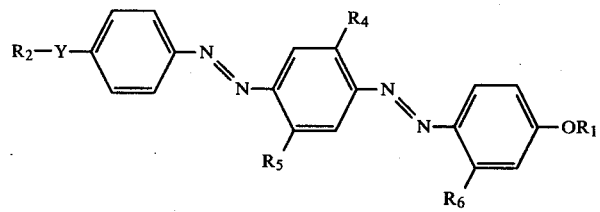

| | $R_2-Y$ | $R_1$ | $R_4$ | $R_5$ | $R_6$ | Degree of order |
|---|---|---|---|---|---|---|
| 2 | Cl—⟨⟩—CH₂O— | CH₃ | H | H | H | 0.66 |
| 3 | CH₃—⟨⟩—CH₂O— | C₂H₅ | H | H | H | 0.65 |
| 4 | H | CH₂—⟨⟩ | H | H | H | 0.68 |
| 5 | CH₃O | CH₂—⟨⟩ | OCH₃ | H | H | 0.69 |

-continued

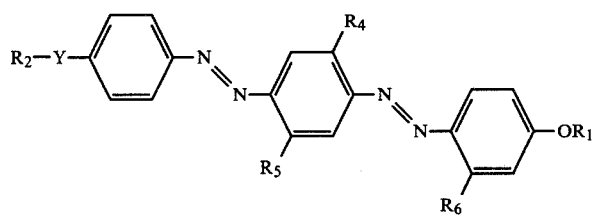

| | R2—Y | R1 | R4 | R5 | R6 | Degree of order |
|---|---|---|---|---|---|---|
| 6 | ⌬—CH2O | CH3 | OCH3 | OCH3 | H | 0.61 |
| 7 | H | CH2—⌬ | H | H | CH3 | 0.62 |
| 8 | CH3SO2—O | CH2—⌬ | H | H | H | 0.63 |
| 9 | H3C—⌬— | CH2—⌬ | H | H | H | 0.66 |
| 10 | ⌬H—NHCO— | CH2—⌬—CH3 | H | H | H | 0.61 |
| 11 | ⌬—CO O | CH2—⌬ | H | H | H | 0.59 |
| 12 | ⌬—CO O | CH3 | CH3 | H | H | 0.64 |
| 13 | CH3O | CH2—⌬ | H | OCH3 | H | 0.69 |

I claim:
1. Liquid crystal composition comprising a host liquid crystal having dissolved therein a disazo dyestuff of the formula

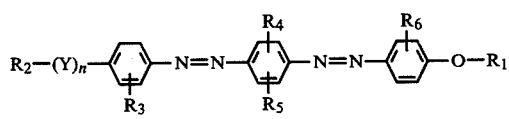

in which
R_1 designates alkyl, aralkyl, cycloalkyl, aryl, or a R—NH—CO—,
in which
R represents alkyl, aralkyl, cycloalkyl or aryl, it being possible for the radicals mentioned for R_1 to be substituted by fluorine, chlorine, bromine, $C_1$-$C_8$-alkyl, trifluoromethyl, $C_1$-$C_8$-alkoxy, nitro, cyano, amino, amino which is optionally mono or disubstituted by $C_1$-$C_8$-alkyl or phenyl, and
n is 0 or 1,
Y designates —O—,
$R_2$ has one of the meanings given above for $R_1$, if n=1, or is hydrogen, if n=0, and
$R_3$, $R_4$, $R_5$ and $R_6$ designate hydrogen, alkyl, alkoxy, halogen or cyano.

2. Liquid crystal composition according to claim 1, containing a disazo dyestuff of the formula I in which $R_1$ and $R_2$ are different.

3. Liquid crystal composition according to claim 1 in which $R_1$ and $R_2$ (for n=1) designate $C_1$-$C_8$-alkyl, benzyl, phenethyl, $C_3$-$C_7$-cycloalkyl, phenyl, naphthyl, or a R'—NH—CO— group, in which R' represents $C_1$-$C_8$-alkyl, benzyl, phenethyl, $C_3$-$C_7$-cycloalkyl, phenyl or naphthyl, it being possible for the radicals mentioned $R_1$ and $R_2$ to be substituted as stated in claim 1, and $R_3$, $R_4$, $R_5$ and $R_6$ designate hydrogen, $C_1$-$C_6$-alkyl or $C_1$-$C_6$-alkoxy, fluorine, chlorine, bromine or cyano.

4. Liquid crystal composition according to claim 1, containing a disazo dyestuff of the formula I in which $R_1$ and $R_2$ (for n=1) represent $C_1$-$C_8$-alkyl, benzyl, which can be substituted by fluorine, chlorine, bromine, $C_1$-$C_8$-alkyl, trifluoromethyl, $C_1$-$C_8$-alkoxy, nitro, cyano, amino or amino which is optionally monosubstituted or disubstituted by $C_1$-$C_8$-alkyl or phenyl, or phenyl, which can be substituted by fluorine, chlorine, bromine, $C_1$-$C_8$-alkyl, trifluoromethyl, $C_1$-$C_8$-alkoxy, nitro, cyano, amino or amino which is optionally monosubstituted or disubstituted by $C_1$-$C_8$-alkyl or phenyl, or a R—NH—CO— group, in which R represents $C_1$-$C_8$-alkyl, cyclohexyl or phenyl, or $R_2$ (for n=0) designates hydrogen.

5. Liquid crystal composition according to claim 1, containing a disazo dyestuff of the formula I in which $R_3$, $R_4$ and $R_5$ represent hydrogen, $C_1$-$C_4$-alkyl or $C_1$-$C_4$-alkoxy.

6. Liquid crystal composition according to claim 1, containing a disazo dyestuff of the formula I in which $R_1$ and $R_2$ are different and one of these radicals represents benzyl, which can be substituted by fluorine, chlorine, bromine, $C_1$-$C_8$-alkyl, trifluoromethyl, $C_1$-$C_8$-alkoxy, nitro, cyano, amino or amino which is optionally monosubstituted or disubstituted by $C_1$-$C_8$-alkyl or phenyl.

7. Liquid crystal composition according to any one of claims 1-6, containing about 0.01 to about 30% by weight, preferably about 0.5 to about 5% by weight, of said disazo dystuff.

8. A liquid crystal composition according to claim 1 wherein $R_1$ designates R—NH—CO—.

9. A liquid crystal composition according to claim 1 wherein n is 0.

10. A liquid crystal composition according to claim 1 wherein n is 1.

* * * * *